United States Patent [19]

Strohmeyer et al.

[11] Patent Number: 4,646,585
[45] Date of Patent: Mar. 3, 1987

[54] PIVOT HOUSING FOR A SHIFT LEVER HAVING A REVERSE LOCK

[75] Inventors: Erich Strohmeyer, Einbeck; Karl-Heinz Marschhausen, Dassel, both of Fed. Rep. of Germany

[73] Assignee: FHS Stahlverformung GmbH, Iserlohn, Fed. Rep. of Germany

[21] Appl. No.: 809,478

[22] Filed: Dec. 16, 1985

[30] Foreign Application Priority Data

Dec. 18, 1984 [DE] Fed. Rep. of Germany ... 8437043[U]

[51] Int. Cl.⁴ .................. F16H 57/06; G05G 9/12
[52] U.S. Cl. ..................................... 74/476; 74/473 P
[58] Field of Search ................ 74/473 R, 473 P, 475, 74/476, 538

[56] References Cited

U.S. PATENT DOCUMENTS

| 1,241,414 | 9/1917 | Masury et al. | 74/476 |
| 2,876,485 | 3/1959 | Cowles | 411/907 |
| 3,597,992 | 8/1971 | Lowry | 74/476 |
| 3,707,095 | 12/1972 | Uhlenhaut et al. | 74/473 R |
| 4,118,999 | 10/1978 | Bieber | 74/476 X |

FOREIGN PATENT DOCUMENTS 490522  8/1975  Australia ................ 74/476

Primary Examiner—Allan D. Herrmann
Attorney, Agent, or Firm—Ronald G. Goebel

[57] ABSTRACT

The reverse lock of a motor vehicle transmission is made up of a locking member on the shift lever and of an abutment. To override the reverse lock the locking member is moved clear of the abutment. The latter is provided on a separate ring that is mounted over or in a sleeve-like head on the body of the transmission and is held in place thereon by detent means. The shift lever extends through the sleeve-like head.

3 Claims, 3 Drawing Figures

PIVOT HOUSING FOR A SHIFT LEVER HAVING A REVERSE LOCK

BACKGROUND OF THE INVENTION

The invention relates to a pivot bearing housing for the shift lever of an automobile transmission with a reverse lock having an abutment for the locking member, on the shift lever, which can be moved clear of the abutment for putting the transmission into reverse.

Shift levers for vehicle transmissions and more especially for private cars with a reverse lock intended to prevent the driver from unintentionally putting the transmission into reverse, are in general use. As a rule they comprise a locking member which so cooperates with an abutment on the pivot housing, in which the shift lever pivots, that the shift lever may only be shifted into the position needed for reverse after the locking member has been moved clear of the abutment, something made possible by an actuating part on the shift lever. The abutment for the shift lever is formed on the pivot housing as such.

SHORT OUTLINE OF THE INVENTION

One object of the present invention is to devise a pivot housing for a transmission shift lever having a reverse lock of the afore-mentioned type, which may be provided with the abutment for the locking member of the shift lever in a simple manner.

In order to achieve this or other objects that will appear in the course of the present specification and claims, the abutment is provided on a separate ring which engages a supporting sleeve-like housing head having the shift lever extending through it, said ring interlocking with said housing head by spring catch means.

Further useful features of the pivot housing in accordance with the invention, for a transmission shift lever with a reverse lock are to be seen in the claims.

In the case of the present pivot housing for a transmission shift lever with a reverse lock, the abutment for the locking member of the shift lever is provided on a separate ring which may be slipped over or into, and interlocked with, the sleeve-like head of the housing having the shift lever passing through it. Preferably, the ring is made of plastic or resin, whereas the head on the housing, like the rest of the pivot housing, is manufactured of metal. This makes it more especially possible to use an essentially unitary basic structure for the pivot housing of the transmission shift lever subsequently fitted with a reverse lock that becomes operational in different positions of pivoting of the shift lever. In order to produce a pivot housing, for a transmission shift lever with a reverse lock, it is only necessary to place the ring, with the abutment suitably aligned in accordance with that pivot setting of the shift lever for the locking member of the lever in which the reverse lock is to take effect. The pivot housing in accordance with the invention for transmission shift levers with a reverse lock may be quite readily adapted to a wide range of different shift lever motion schedules. The ring having the abutment for the locking member of the shift lever may be readily made of resin and may also be readily fitted. If it is made of plastic there will then be the added advantage that it will have a low weight and the ring will be quiet in operation.

An account will now be given of one working example of the pivot housing in accordance with the invention for transmission shift levers with a reverse lock with reference to the drawings.

LIST OF THE SEVERAL VIEWS OF THE DRAWINGS

DETAILED ACCOUNT OF EMBODIMENT OF THE INVENTION

Figure 1:
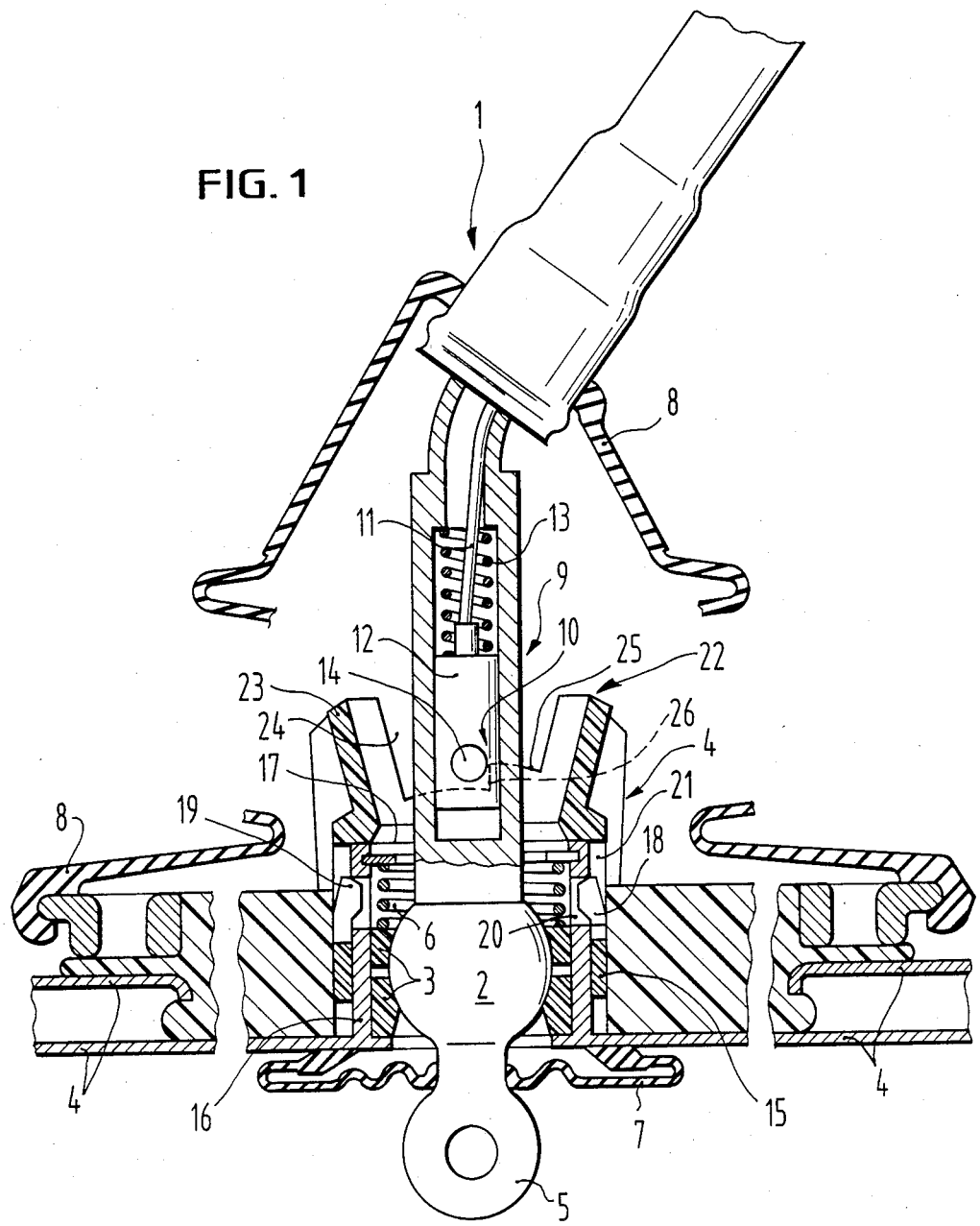
FIG. 1 is a longitudinal section taken through a transmission shift lever assembly with a reverse lock and which is mounted in a pivot housing in accordance with the present invention.
Figure 2:
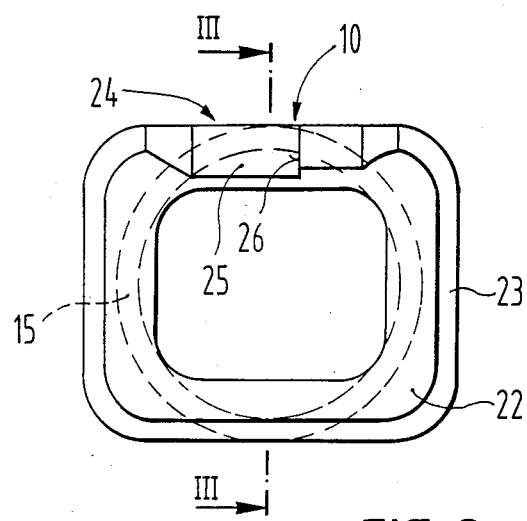
FIG. 2 is a view looking down on the ring of the pivot housing in accordance with FIG. 1.
Figure 3:
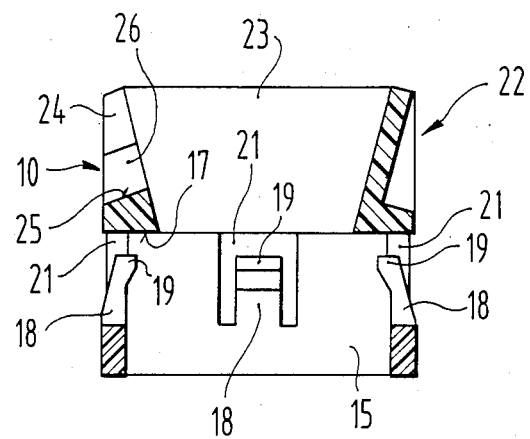
FIG. 3 is a section taken on the line III—III of FIG. 2.

The shift lever 1 of a transmission has a spherical section 2 or knob by means of which it is pivot-mounted in a socket 3 in a pivot housing 4 so that it may be swiveled not only in the plane of the drawing of FIG. 1 but furthermore perpendicularly thereto so that its lower end 5 will shift the gears of the vehicle transmission and produce different transmission ratios. The pivot socket 3 is composed of a plurality of segments which are pressed by a helical pressure spring 6 against the spherical section 2 of the shift lever 1. Over the lower end 5 of the shift lever 1 and the pivot housing 4 there is a boot 7 or cap and between the shank of the shift lever 1 projecting upwards from the pivot housing 4 and the latter there is a further sealing boot 8.

To produce a reverse locking effect the shift lever 1 is provided with a locking member 9 which cooperates with an abutment 10 of the pivot housing 4 and has to be shifted clear thereof before the transmission may be put into reverse. In this connection the shift lever 1 has an actuating member, which is connected via a pull tie 11 extending along and inside the hollow shift lever 1, with an axially moving plunger 12. The plunger 12 is urged by a helical pressure spring 13 towards the lower end 5 of the shift lever 1 and into that position in which the reverse lock takes effect, that is to say in which the transmission may not be put into reverse. The plunger 12 has a transverse pin 14 whose one end extends out of the shift lever 1 in order to cooperate with the abutment 10 of the pivot housing 4 and thus form the locking member 9 as such.

The abutment 10 of the pivot housing 4 is provided on a separate ring 15 of plastic, which is slipped onto a sleeve-like head 16 on the housing and interlocks with such head, which surrounds the socket 3 and like the rest of the pivot housing 4 is made of metal. The ring 15 has a downwardly facing shoulder 17 engaging the upper end face of the head 16 and is retained in this position by locking or detent fingers 18 on the head 16 of the housing, the free ends 19 of the fingers 18 fitting into corresponding holes 20 in the head 16 on the housing.

The retainer fingers 18 of the ring 15 are made integrally therewith and are placed in respective openings 21 in the ring 15 running in the length direction thereof and pointing towards its shoulder 17 and may be resiliently bent to the side so that the free ends of the fingers 18, which trail as the ring 15 is slipped onto the head 16 of the housing, then firstly snap radially out into the openings 21 in the ring 15 and are then able to snap back inwards into their initial positions in order to pass into the holes 20 in the head 16 on the housing and retain the ring 15 thereon, this being illustrated in FIG. 1. The ring 15 and the head 16 on the housing are cylindrical in design. The detent fingers 18 and the holes 20 therefor are evenly distributed in the circumferential direction of the ring 15 and of the head 16 on the housing, respectively.

The ring 15 is provided with a projection 22 extending away from the head 16 and on which the abutment 10 for the locking member 9 of the shift lever 1 is provided. The projection 22 is in the form of a sleeve 23 placed coaxially in relation to the ring 15 and which has a recess 24 to accept the locking member 9. The lower limit 25 of the recess 24 is fashioned with a step 26 which forms the abutment 10 for the locking member 9 of the shift lever 1.

When the driver intends to put the transmission into reverse it is necessary for the shift lever 1 to be pivoted out of the position shown in FIG. 1 in a clockwise direction towards him or her, something that will only be possible if the reverse lock is not in operation, i.e. is overridden. To override the reverse lock the actuating member (not shown) of the shift lever 1 is moved, in order to move the plunger 12 by way of the pull tie 11 against the action of the helical pressure spring 13 in the length direction of the shift lever 1, and to so move the transverse pin 14 that the locking member 9 is moved up and past the step 26 and comes clear of the abutment 10. The lower limit 25 of the recess 24 of the sleeve-like projection 22 of the ring 15 is curved on both sides of the step 26 so that the end of the transverse pin 14 protruding from the shift lever 1 may slide on the curved parts.

The form of the invention described is susceptable of modifications, and as an example, it is not absolutely essential for the ring 15 and the head 16 on the housing to be cylindrical in form: they may have a different configuration in cross section as for example an elliptical, square or other rectangular one. Furthermore it is possible for the ring 15 and the head 16 on the housing to be so designed that the ring 15 may be inserted or slipped into the head 16 and then releasably interlocked therewith. A further consideration is that it is not essential for the projection 22 to be in the form of a sleeve and it may for instance be embodied in the form of a single wall, which extends on that side of the shift lever 1, at which the transverse pin 14 protrudes from it and on which the step 26 is formed on the side remote from the head 16 of the housing. Finally it is perfectly feasible to have a different arrangement of the abutment 10 on the ring 15 if the reverse lock is to take effect in a different position of pivoting of the shift lever 1; just as it is also possible to use the locking member 9 and the abutment 10 for locking another gear, more especially the fifth gear or overdrive in the case of a transmission with such facility The locking fingers 18 on the ring 15 and the holes 20 therefor in the head 16 on the housing do not necessarily have to be evenly spaced out circumferentially on the pivot housing 4, and it fact they may have a different distribution. It is also basically possible for the locking fingers 18 to be provided on the head 16 of the housing and for the holes 20 therefor to be in the ring 15.

We claim:

1. A motor vehicle transmission shifting device comprising a pivot housing, a shift lever pivotally mounted therein and overridable reverse lock means, said lock means including a locking member on said shift lever and an abutment on said pivot housing, said locking member being adapted to be moved clear of said abutment for putting said transmission into reverse said abutment being provided on a ring secured to a sleeve-like head on said pivot housing through which said shift lever extends said ring having longitudinally extending and radially resilient locking fingers adapted to fit into corresponding recesses of said head when said ring is secured thereto so that said ring and said head are resiliently interlocked.

2. The device of claim 1 wherein said locking fingers are directed away from an end at an angle to an axis of said ring and are adapted to fit into corresponding recesses of said head when said ring is secured thereto with said end of said ring facing said pivot housing, so that said ring and said head are resiliently interlocked.

3. The device of claim 1 wherein said ring and said head each have a cylindrical configuration and said locking fingers and said recess therefor are evenly spaced along the circumference of said ring and respectively of said head.

* * * * *